United States Patent
Breuer et al.

(10) Patent No.: US 10,798,319 B2
(45) Date of Patent: Oct. 6, 2020

(54) CAMERA DEVICE AND METHOD FOR CAPTURING A SURROUNDING REGION OF A VEHICLE IN A SITUATION-ADAPTED MANNER

(71) Applicant: Conti Temic microelectronic GmbH, Nuremberg (DE)

(72) Inventors: Karsten Breuer, Oberreute (DE); Dieter Kroekel, Eriskirch (DE); Robert Thiel, Niederstaufen (DE); Martin Pfitzer, Bodolz (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/461,172

(22) PCT Filed: Apr. 11, 2017

(86) PCT No.: PCT/DE2017/200031
§ 371 (c)(1),
(2) Date: May 15, 2019

(87) PCT Pub. No.: WO2018/103795
PCT Pub. Date: Jun. 14, 2018

(65) Prior Publication Data
US 2019/0281235 A1   Sep. 12, 2019

(30) Foreign Application Priority Data
Dec. 6, 2016   (DE) .................. 10 2016 224 241

(51) Int. Cl.
*H04N 5/343* (2011.01)
*G06K 9/00* (2006.01)
(Continued)

(52) U.S. Cl.
CPC ......... *H04N 5/343* (2013.01); *G06K 9/00791* (2013.01); *G06K 9/00825* (2013.01);
(Continued)

(58) Field of Classification Search
CPC .... H04N 5/343; H04N 5/2253; H04N 5/2254; H04N 5/347; H04N 7/0155; G06K 9/00791; G06K 9/00825; G06K 9/3233
(Continued)

(56) References Cited

U.S. PATENT DOCUMENTS 8,405,494 B2 * 3/2013 Hilger .................. H04N 7/181
340/435
8,743,202 B2   6/2014 Schick et al.
(Continued)

FOREIGN PATENT DOCUMENTS

DE    102004061998        7/2006
EP         1033694 A2 *   9/2000   ......... G06K 9/00805

OTHER PUBLICATIONS

English translation of the International Search Report of the International Searching Authority for International Application PCT/DE2017/200031, dated Sep. 12, 2017, 2 pages, European Patent Office, HV Rijswijk, Netherlands.
(Continued)

*Primary Examiner* — Michael Lee
(74) *Attorney, Agent, or Firm* — W. F. Fasse

(57) ABSTRACT

A camera device includes an optronics system and an image capture control unit, for acquiring a sequence of images of a surrounding region of a vehicle. The optronics system includes a wide-angle optical system and a high-resolution image acquisition sensor. The optronics system and the image capture control unit are configured to generate a reduced-resolution binned image of the entire capture region of the optronics system, or to capture an unbinned high-
(Continued)

resolution image of a subregion of the capture region, respectively for each individual image of the sequence of images, depending on a current traffic and/or surrounding situation. A height and a width of the subregion are set depending on the current situation. A size of the subregion is set such that the pixel count of the high-resolution image of the subregion is no greater than the pixel count of the reduced-resolution image of the entire capture region.

10 Claims, 3 Drawing Sheets

(51) Int. Cl.
G06K 9/32 (2006.01)
H04N 5/225 (2006.01)
H04N 5/347 (2011.01)
H04N 7/015 (2006.01)

(52) U.S. Cl.
CPC ......... *G06K 9/3233* (2013.01); *H04N 5/2253* (2013.01); *H04N 5/2254* (2013.01); *H04N 5/347* (2013.01); *H04N 7/0155* (2013.01)

(58) Field of Classification Search
USPC .......................................................... 348/149
See application file for complete search history.

(56) References Cited

U.S. PATENT DOCUMENTS

| 2015/0145951 | A1* | 5/2015 | Ko | G09B 29/106 348/36 |
| 2015/0350575 | A1* | 12/2015 | Agranov | H04N 5/37457 348/302 |
| 2017/0019605 | A1* | 1/2017 | Ahiska | H04N 5/217 |
| 2019/0026918 | A1* | 1/2019 | Gomezcaballero | G06K 9/00805 |

OTHER PUBLICATIONS

PCT International Preliminary Report on Patentability including English Translation of PCT Written Opinion of the International Searching Authority for International Application PCT/DE2017/200031, dated Jun. 11, 2019, 9 pages, International Bureau of WIPO, Geneva, Switzerland.

Stephan Matzka et al., "Efficient Resource Allocation for Attentive Automotive Vision Systems", IEEE Transactions of Intelligent Transportation Systems, vol. 13, No. 2, Jun. 1, 2012, XP011445705, ISSN: 1524-9050, DOI: 10.1109/TITS.2011.2182610, pp. 859 to 872.

Stephan Matzka, "Efficient Resource Allocation for Automotive Active Vision Systems", PhD Thesis, Heriot-Watt University, Oct. 1, 2009, XP055392679, Retrieved from the Internet on Jul. 20, 2017: URL:http://www.ros.hw.ac.uk/bitstream/10399/2277/1/MatzkaS_201009_eps.pdf.

Eduardo Romera et al., "A Real-Time Multi-Scale Vehicle Detection and Tracking Approach for Smartphones", 2015 IEEE 18$^{th}$ International Conference on Intelligent Transportation Systems, Sep. 15, 2015, XP032804172, DOI: 10.1109/ITSC.2015.213, retrieved on Oct. 30, 2015, pp. 1298 to 1303.

\* cited by examiner

CAMERA DEVICE AND METHOD FOR CAPTURING A SURROUNDING REGION OF A VEHICLE IN A SITUATION-ADAPTED MANNER

FIELD OF THE INVENTION

The invention relates to a camera device and to a method for capturing a surrounding region of a vehicle in a situation-adapted manner. The invention further relates to the vehicle with such a camera device.

BACKGROUND INFORMATION

Implementing driver assistance devices, such as traffic sign recognition or lane departure warning systems, requires camera systems to have a horizontal angle of view of around 50 degrees and a vertical angle of view of around 30 degrees. However, new functions such as cross-traffic or traffic light recognition when at the head of the queue require a distinctly larger viewing angle if it is to be possible to capture the objects located in the peripheral area of the image on pulling up close. In contrast, highly automated driving or a lane assist system, for example, requires the recognition of objects and carriageway structures also at a great distance, for which reason a corresponding resolution is needed.

In this connection, camera systems are known, for example, which have at least two optronics systems, which differ at least in angle of view and/or in angular resolution, in order thereby to cope with the conflicting requirements of capturing the central region over a long range and of capturing a wide-angle region for cross-traffic recognition. Document DE102004061998A1, for example, accordingly describes a device for a motor vehicle having at least one first camera and at least one second camera, wherein the first and second cameras differ in at least one camera property.

Drawbacks of such camera systems are for example the volumes of data to be processed and the considerable costs owing to the plurality of optronics systems, these being the most expensive components of a camera system.

SUMMARY OF THE INVENTION

A starting point for the solution is an on-board camera device for capturing a surrounding region of an ego-vehicle, as described below.

The surrounding region is for example a surrounding region located to the front in the direction of travel, to the side and/or to the rear of the ego-vehicle.

The camera device has an optronics system which is configured to acquire a sequence of images of the surrounding region. The sequence of images preferably comprises at least two, in particular at least five, specifically at least 20 successively acquired images.

The optronics system comprises a wide-angle optical system. The wide-angle optical system is preferably configured with a horizontal and/or vertical angle of view of for example at least +/−50 degrees, in particular of at least +/−70 degrees and/or of at most +/−80 degrees to the optical axis. The wide-angle optical system allows capture, for example, of a peripheral environment such as the area of an intersection, for early object analysis of road users crossing the intersection. The angles of view determine the field of view (FOV) of the camera device.

The optronics system furthermore comprises a high-resolution image acquisition sensor. By means of the high-resolution image acquisition sensor, it is in particular possible to achieve long-distance object analysis such as the analysis of traffic signs or lanes, i.e. in particular at a distance from the actual vehicle of at least 50 meters. The high-resolution image acquisition sensor is in particular an image acquisition sensor with a pixel count amounting to several megapixels, for example at least five megapixels, preferably at least seven megapixels, specifically at least ten megapixels. The image acquisition sensor preferably has a uniform pixel/cm resolution.

High-resolution image acquisition sensors are classified as unsuitable for automotive use in particular in conjunction with a wide-angle optical system, since they do not allow efficient processing of the large pixel count for the complex image processing algorithms.

Against this background, the optronics system, in particular the image acquisition sensor or an image processing apparatus of the optronics system, is configured to output a sequence of images of the surrounding region with periodically changing high-resolution and reduced-resolution images for example to an image analysis apparatus of the camera device. Thus, in particular images of the sequence of images are output alternately with set regularity at high resolution and at reduced resolution. The optronics system is for example configured to output at least every tenth, in particular at least every fifth, particularly preferably every second image of the sequence of images with reduced resolution. In particular, a reduced-resolution image is not selected from the sequence of images in arbitrary manner.

In particular, the high-resolution images have a higher resolution than the reduced-resolution images. A high-resolution image should preferably be understood to mean an image which at least in places has a resolution in the horizontal and/or vertical angle of view of at least 40 pixels per degree, specifically of at least 50 pixels per degree. For example, the high-resolution image is output at the highest resolution available to the optronics system.

A reduced-resolution image should be understood in particular to mean an image with reduced resolution over the entire image area. The reduced-resolution images for example in each case have a resolution in the horizontal and/or vertical angle of view at least in places of at most 30 pixels per degree, specifically of at most 20 pixels per degree. The images output with reduced resolution preferably have at least approximately the same pixel count and/or a uniform, specifically uniformly distributed, pixel size distribution.

A major advantage of the periodic changeover is the on average approximately identical or slightly higher computational overhead needed to analyze the images compared with vehicle cameras which, to achieve a realizable image processing overhead, have hitherto either had such low rates of resolution that long-distance analysis is impossible or inadequately possible or, owing to an otherwise excessively high computational overhead, have solely such a small capture region as possibly to result in late analysis of relevant target objects.

Thus, despite the high-resolution image acquisition sensor and the wide-angle optical system, it is possible to achieve a computational overhead which allows the analysis of target objects in the periodically alternately high-resolution and reduced-resolution images. Accordingly, the conflicting aims regarding the implementation of driver assistance devices of achieving the largest possible capture region and at the same time a sufficient resolution for the long-distance analysis of target objects with a realizable image processing overhead are achieved with just one camera device.

Also noteworthy are on the one hand the compact structural size and on the other hand the considerable savings in costs for the camera device compared with camera devices with two or even three optronics systems.

The image acquisition sensor of the optronics system is preferably configured to acquire the sequence of images over the periodic changeover between high-resolution and reduced-resolution images. Since the sequence of images is thus already acquired over the periodic changeover between high-resolution and reduced-resolution images, the optronics system, specifically the image acquisition sensor, is for example configured to output the acquired sequence of images unchanged at least with regard to resolution, and optional additionally with regard to field of view.

In an alternative exemplary configuration, the image acquisition sensor is configured to acquire the sequence of images in particular exclusively with high-resolution images. It is furthermore preferable for the image processing apparatus of the camera device, in particular of the optronics system, to be configured to generate reduced-resolution images from the images acquired at high resolution according to the periodic changeover and to transmit them as the sequence of images changing periodically between high-resolution and reduced-resolution images for example to the optronics system or to output them directly for example to an image analysis apparatus. In this exemplary embodiment, resolution is thus preferably reduced subsequent to image acquisition. The image acquisition sensor is for example connected to the image processing apparatus for transmission of the acquired sequence of images. The reduced-resolution images output by the image processing apparatus are preferably at least partially reduced-resolution images compared with the associated acquired images.

In a preferred embodiment, the image acquisition sensor or the image processing apparatus is configured to generate the acquired images or the images to be acquired, the resolution of which is to be reduced, in reduced-resolution manner using pixel binning. In particular, during pixel binning adjacent pixels are combined for example within a row and/or a column or in a for example rectangular sub-region of the respectively acquired image and associated with a new pixel. The resultant pixel matrix of the reduced-resolution image thus in particular has a lower resolution than the associated acquired image.

Alternatively or optionally additionally, the image acquisition sensor or the image processing apparatus is configured to generate the acquired images or the images to be acquired, the resolution of which is to be reduced, in reduced-resolution manner using pixel skipping. In particular, pixel skipping involves skipping over pixels in the initial image in a set sequence, such that preferably only a fractional amount of the pixels is adopted for the result image. In this way, in particular a lower resolution of the result image is implemented and consequently the volume of data is reduced.

In particular, in each case at least or precisely one high-resolution and reduced-resolution image is output per processing cycle and object analysis of the images output in this processing cycle is performed. The set time interval of the processing cycle should not be exceeded, in order to ensure early and reliable performance of driver assistance functions associated with target object recognition.

Against this background, in a first variant, the images output in high-resolution and reduced-resolution manner have at least approximately the same pixel count. In particular, at least approximately the same pixel count should be understood to mean a deviation of 0.5 megapixels at most. Thus, in particular each image of the output sequence of images has a pixel count of for example two megapixels. One high-resolution and one reduced-resolution image with the same pixel count are for example consequently output per processing cycle.

Should, on the other hand, according to a second preferred configuration, at least three images, in particular at least two high-resolution and one reduced-resolution image, be output per processing cycle, the at least two high-resolution images preferably together have at least approximately the same pixel count as the reduced-resolution image. In this way, the workload of the image analysis apparatus is kept constant per processing cycle and in particular undesired peaks, and the associated time-consuming image analysis, are prevented.

The images output with high resolution in particular have a smaller image size than the images output with reduced resolution. Thus, the high-resolution and reduced-resolution images may have the same pixel count without in the process requiring greater processing power. This makes it possible to output reduced-resolution images with a larger capture region and high-resolution images with a smaller capture region with a constant computational overhead. Consequently, with periodic changeover, a long-range object analysis and one rich in detail are made possible with a constant image processing overhead.

Relevant target objects in the peripheral image portion need in particular to be analyzed at low vehicle speeds in the urban environment, whereas on rural roads they have to be analyzed at high vehicle speeds in particular in the long-distance region of the central image portion. Against this background, the camera device, specifically the image acquisition sensor or the image processing apparatus, is preferably configured to set an image size and/or position of the respective image to be output with high resolution within the total available acquisition area of the image acquisition sensor, wherein setting proceeds as a function of a currently determined vehicle speed and/or a currently determined steering angle of the ego-vehicle. The vehicle speed and/or the steering angle allow conclusions to be drawn as to which category of road the ego-vehicle is currently traveling on, for example a local road or a freeway. This ensures that relevant target objects are analyzed with the necessary resolution.

Alternatively or optionally in addition, the camera device, specifically the image acquisition sensor or the image processing apparatus, is preferably configured to set the image size and/or position of the high-resolution image as a function of a determined traffic space ahead and/or of the category of road on which the ego-vehicle is currently traveling. By determining the traffic space ahead, relevant traffic areas with characteristic target objects may be captured, for example an intersection area with road users crossing the intersection. With regard to the road category, a distinction is drawn, for example, between a freeway, major road and/or a local road. Determining the traffic space ahead and/or the road category makes it possible to adapt the image size and/or position at least of the high-resolution images as a function of the current vehicle surroundings and thus for example to select them individually for the target objects to be analyzed, in the form of a Region of Interest (ROI).

For example, the ego-vehicle has a locating device such as a GPS sensor, which is configured to determine the current position, i.e. the current location of the ego-vehicle in which the camera device is integrable or integrated. Furthermore, the ego-vehicle for example comprises an on-board navigation data server for retrieval of electronic maps and charts. An analysis unit of the ego-vehicle is preferably configured to analyze, using the determined position of the ego-vehicle and using information data from the electronic maps and charts, the traffic space ahead and/or the road category on the basis of the current position of the ego-vehicle and to transmit the analyzed traffic space or the road category to the camera device.

The greater the range of long-distance object analysis, the more reliable and predictive is the performance of the driver assistance functions of the driver assistance devices. Against this background, a particularly preferred configuration provides for the acquired images in each case at least in part to have in the central image portion a resolution which is higher than, in particular at least double, the resolution of the peripheral image portion. For example, the central image portion has a horizontal and/or vertical angle of view of at most +/−25 degrees and/or the peripheral image portion adjoining the central image portion has a horizontal and/or vertical angle of view of at least +/−50 degrees. Particularly preferably, the resolution decreases at least in places as the horizontal and/or vertical angles of view increase in magnitude. In this way, in the central image portion target objects may be analyzed both at close range, for example in the distance range of between 1 and 50 meters, and also at long range, for example in the distance range of between 50 and 500 meters. Since in the peripheral image portion it is above all target objects at close range, for example cyclists crossing in the area of an intersection, that need to be analyzed, a lower resolution, resulting for example from an anamorphic wide-angle optical system, is possible for object analysis.

To implement the at least partially higher resolution in the central image portion, it is preferable from the point of view of structural design for the wide-angle optical system to be configured with variable, in particular nonlinear distortion, specifically as an anamorphic wide-angle optical system. In particular, a resolution of up to 50 pixels per degree may be achieved by means of the variable distortion as a function of the resolution of the image acquisition sensor. This in particular makes possible the resolution needed for long-distance object analysis without an additional telephoto optical system.

In one preferred further development, the wide-angle optical system has at least or precisely one lens, which is configured at least in portions, for example the spherical surface portion, to be panamorphic, specifically anamorphic. Panamorphic, specifically anamorphic lenses bring about, at least in places, a distortion of the initial image and in particular enable, due to their elliptical shape, a larger coverage in area terms compared with other lens shapes, such that more pixels may be achieved per mapped zone. In this way, despite the distortion, improved identification of target objects is achieved in the central image portion.

The camera device preferably comprises an image analysis apparatus. The image analysis apparatus, specifically a processor used in the automotive sector, is preferably configured to analyze, from the images output by the optronics system, in each case at least one target object such as lanes, pedestrians, cyclists and/or other road users.

Preferably a hierarchy, also known as a pyramid structure, of images with different resolutions is computed from the high-resolution and reduced-resolution images of the output sequence of images. For example, in each case at least three images with a 50% lower resolution are provided from the high-resolution and reduced-resolution images of the output sequence of images. In particular, first of all the lowest-resolution image of the respectively output image is interrogated by the image analysis apparatus for the purpose of object recognition, to keep the computational overhead as low as possible. Should the image analysis apparatus recognize a target object in the lowest-resolution image, it preferably has recourse to the next higher-resolution representation in particular to validate the object recognition.

The camera device furthermore preferably comprises at least one driver assistance device, such as a lane or turn assistance device or is connectable therewith. The driver assistance device is configured in particular to perform at least one passive and/or active driver assistance function, such as distance alert, emergency braking or an autonomous evasive driving action as a function of the at least one analyzed target object.

A second starting point consists of a method for capturing a surrounding region of an ego-vehicle with a camera device according to the above description. Here, the sequence of images is output with the periodic changeover, for example alternating or in a set sequence, between high-resolution and reduced-resolution images. For example, the sequence of images with high-resolution images is acquired and output over the periodic changeover with unchanged high-resolution images and the reduced-resolution images. Alternatively, the sequence of images is acquired in the first place with the periodic changeover between high-resolution and reduced-resolution images and is output unchanged.

For example, the resolution of the respective image is reduced by means of electronic pixel binning and/or pixel skipping on the image acquisition sensor. Thus, preferably only a fractional amount of the total pixel count is output by the image acquisition sensor, wherein the remainder of the pixel count is masked or merged together. Alternatively, resolution reduction takes place downstream of image acquisition, for example using subsequent pixel binning and/or pixel skipping.

In particular, the sequence of images is output to an image analysis apparatus for analysis of at least one target object. Preferably, at least one target object is analyzed in each case from the images output in a manner changing periodically between high resolution and reduced resolution. For example, on the basis of the at least one analyzed target object, a driver assistance function, for example a braking, alert and/or steering assistance function, is executed.

To summarize, a changeover between an unbinned image in the central region or two unbinned images at the left-hand and right-hand edges with a binned image over the full Field of View serves as starting point, the unbinned images always being half the height and half the width (in the case of the two peripheral images overall) of the binned image.

Since embedded image-processing processors are unable to process the high resolutions of around 8 megapixels directly, i.e. in real time, even in the medium term, resolution reduction is necessary. This is achieved either by the imager combining pixels in fours (binning), the full field of view thus being available at half resolution in the image, or by reading in only a portion of the field of view in full resolution. In this case, in each time step which results from the frame rate of the imager (for example 33 frames per second) it is only ever possible to read in one of these images. If, therefore, a larger horizontal field of view is required in high resolution (for example for an intersection situation on a main road), the constituents thereof (i.e. for example left-hand subimage, right-hand subimage) are read in individually, which takes a correspondingly longer time. A central unbinned image, on the other hand, does not offer a sufficiently large field of view for the situation mentioned by way of example, such that only the binned image can be used, at half frame rate and at half resolution.

The two methods increase the latency of a system connected to the detection system (for example an emergency braking system), which has a negative effect on the performance thereof.

The solution is intended to offer the field of view needed for each situation, with the lowest possible latency while simultaneously utilizing the full resolution of the imager.

The proposed solution is therefore:

Depending on the traffic and/or the surrounding situation, the following measures are taken dynamically by the camera's image controller, either at each exposure time or over the timed changeover with optionally dynamically variable ratio:

use of an unbinned ROI (region of interest) with dynamic adaptation of the height and width thereof depending on the current situation (i.e. the required horizontal field of view), wherein the image preferably does not exceed a maximum pixel count (for example 2.5 megapixel), the image width (and thus indirectly its height) preferably being controlled by way of content recognized in previous images (for example object, course of the road) and predictions thereof for the current image use of the binned image with half resolution of the imager in situations with maximum FoV requirements but only low required range (typical: urban streets).

A camera device according to the invention for capturing a surrounding region of an ego-vehicle comprises an optronics system and an image capture control unit, which are configured to acquire a sequence of images of the surrounding region. The optronics system comprises a wide-angle optical system and a high-resolution image acquisition sensor. The optronics system and the image capture control unit are configured or designed—to generate an image, the resolution of which is reduced by pixel binning, of the entire capture region of the optronics system for each image of the sequence of images or to capture a subregion of the capture region of the optronics system with maximum resolution;

depending on a current traffic and/or surrounding situation (current situation), either to generate a binned image with reduced resolution (for example ¼ of the pixels) of the image acquisition sensor or to capture an image of an unbinned subregion, wherein height and width of the subregion are set depending on the current situation and, wherein the size of the subregion is set such that the pixel count of the image of the subregion is no greater than the pixel count of the reduced-resolution image of the entire capture region of the optronics system.

This means that each image of the sequence of images does not exceed a maximum number of "final pixels".

The effect of this is that the individual images may be preprocessed at the same time (for example demosaicing).

The image capture control apparatus corresponds to or is at least one component of the processing unit (for example system-on-chip, SoC) in which the image control (image capture control) "control program" is executed. The image capture control apparatus may also be known as an image processing apparatus. The task of the image capture control apparatus is in particular to control the production of reduced-resolution images or the capture of an image of a subregion with maximum resolution by the optronics system.

Depending on a current traffic or surrounding situation, it is possible, on the one hand, to determine whether a binned "overview image" of the complete capture region of the optronics system or an unbinned image of a predetermined subregion should currently be acquired or generated. On the other hand, the subregion is likewise adapted with regard to height and width (optionally also with regard to the position thereof) to the current situation. Examples of current traffic or surrounding situations may be:

driving on a freeway
driving cross-country
driving straight ahead
winding route
urban traffic
intersection situation
traffic light control
zebra crossing
overtaking maneuver and/or
collision risk (stationary obstacle, moving obstacle, pedestrian, cyclist, animal etc.).

An advantage of the solution may be considered to be that it is ensured that critical image content is captured with each exposure cycle and the detection range is kept at a maximum without demanding too much of the image-processing processor. In this way, the lowest possible latency may be achieved for driver assistance systems or active safety systems.

The optronics system and the image capture control unit are advantageously configured to acquire the sequence of images in such a way that the center point of each subregion is identical to the center point of the entire capture region of the optronics system ("quasi-concentric"). In other words, the adapted ROIs may in each case have the same image center point as the overall image or field of view of the camera device.

The optronics system and the image capture control unit are optionally configured to shift the vertical position of the subregion as a function of the current situation. Thus, dynamic adaptation of the horizontal position of the unbinned image is conceivable, but is often not necessarily appropriate, since it could be disadvantageous for various algorithms (for example ego-motion estimation from camera data) and could have a negative effect on the recognition of new objects relevant for ROI control.

The optronics system and the image capture control unit are preferably alternatively or additionally configured to shift the vertical position of the subregion as a function of the current situation.

A vertical shift would appear to be more sensible in certain cases, since it is less disadvantageous for image analysis algorithms to be run subsequently.

It goes without saying that further aspects which have already been explained in detail in the detailed description of the starting point may be combined with the further solution now described to achieve further advantages.

BRIEF DESCRIPTION OF THE DRAWINGS

Exemplary embodiments of the invention are explained in greater detail below with reference to schematic drawings.

DETAILED DESCRIPTION OF EXAMPLE EMBODIMENTS OF THE INVENTION

Figure 3:
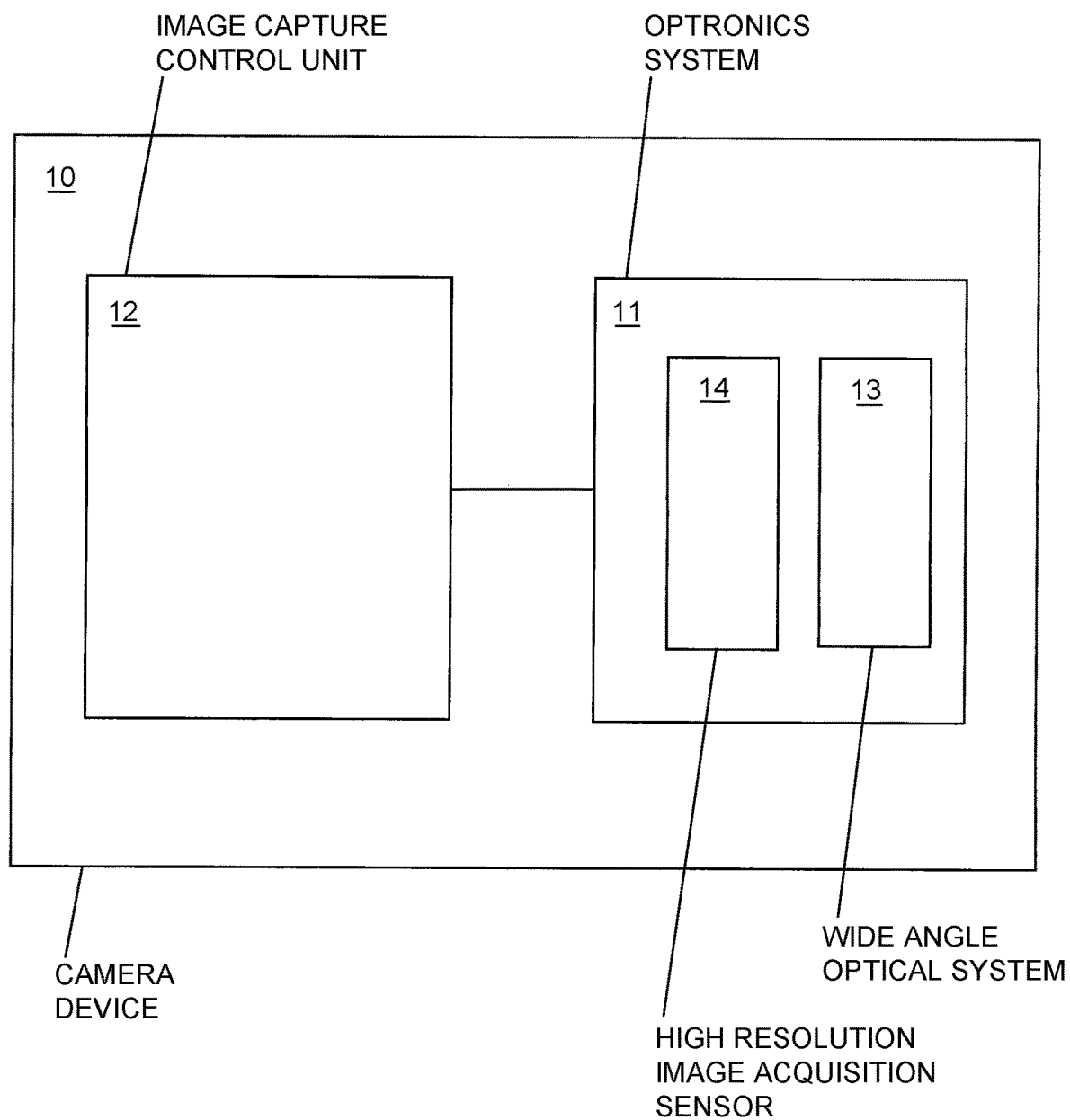
FIG. 3 is a schematic diagram representing an example embodiment a camera device including an optronics system and an image capture control unit according to the invention.

FIG. 3 schematically represents an embodiment of a camera device 10 for capturing a surrounding region of a vehicle. The camera device 10 comprises an optronics system 11 and an image capture control unit 12, which are configured to acquire a sequence of images of the surrounding region. The optronics system 11 comprises a wide-angle optical system 13 and a high-resolution image acquisition sensor 14.

Figure 1:
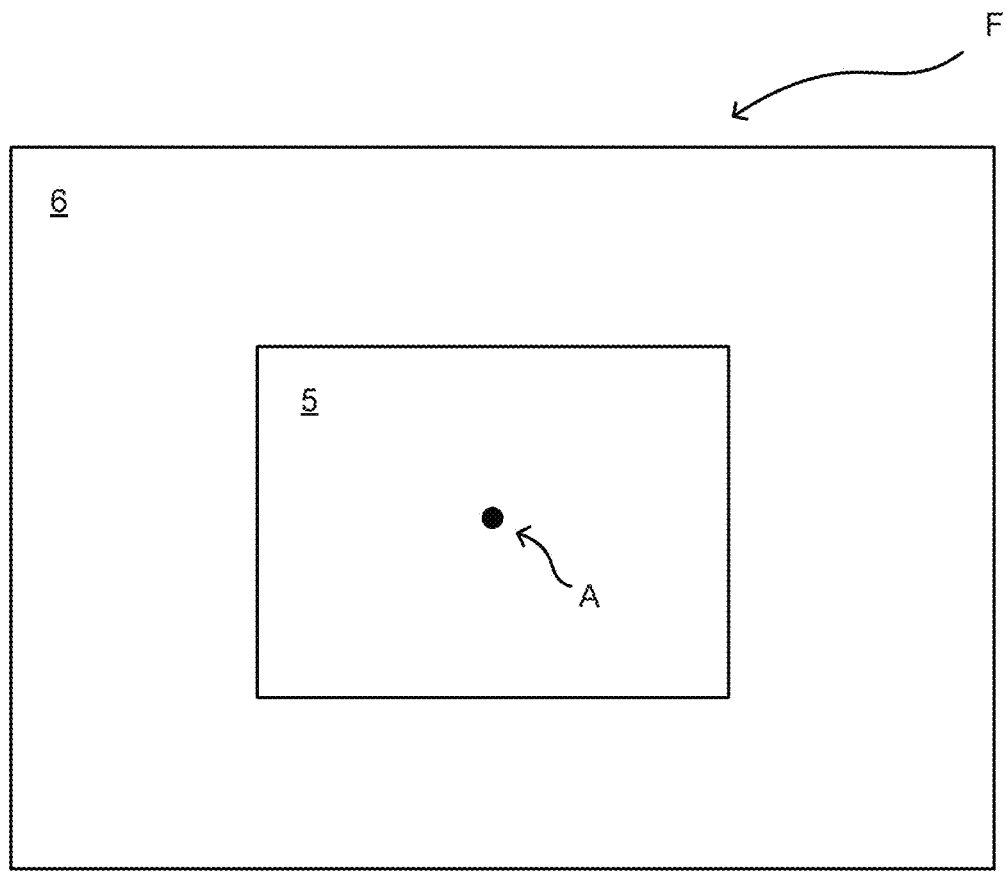
FIG. 1 is a schematic diagram representing two types of images acquired with the camera device.
Figure 2:
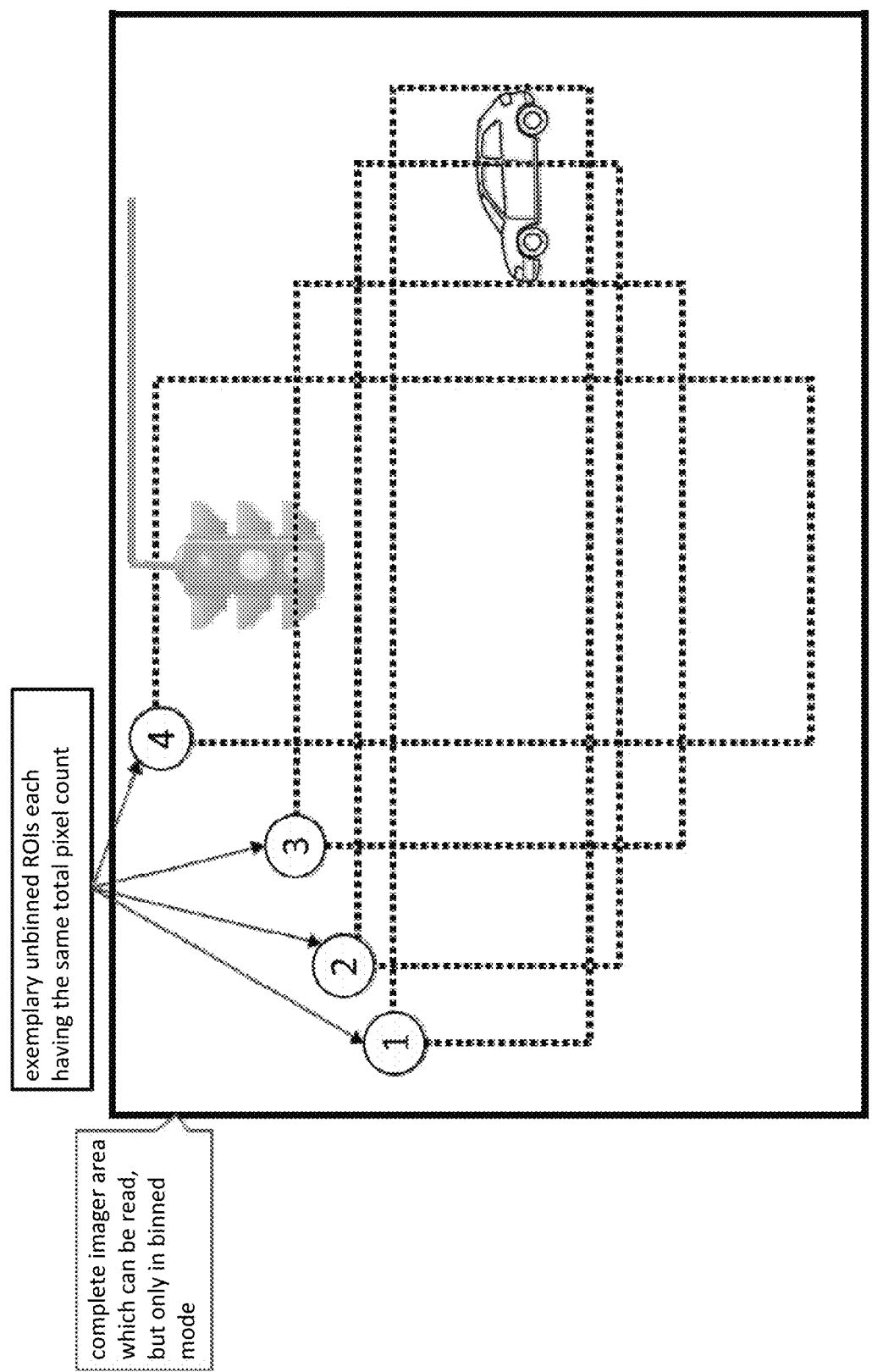
FIG. 2 is a schematic diagram representing different regions of interest (ROI) that can be captured in respective corresponding images.

With further reference to FIGS. 1 and 2, the optronics system 11 and the image capture control unit 12 are configured to generate a reduced-resolution image 6, the resolution of which is reduced by pixel binning, of the entire capture region of the optronics system 11, or to capture a high-resolution image of a subregion 1, 2, 3, 4, 5 of the capture region of the optronics system 11 with maximum resolution, respectively for each individual image of the sequence of images. The optronics system 11 and the image capture control unit 12 are further particularly configured to either generate the reduced-resolution image as a binned image 6 with reduced resolution of the image acquisition sensor 14, or capture the high-resolution image as an unbinned image of the subregion 1, 2, 3, 4, 5, depending on a current traffic and/or surrounding situation. The image height and the image width of the subregion 1, 2, 3, 4, 5 are set depending on the current situation. The size of the subregion 1, 2, 3, 4, 5 is set such that the pixel count of the high-resolution image of the subregion 1, 2, 3, 4, 5 is no greater than the pixel count of the reduced-resolution image 6 of the entire capture region of the optronics system 11.

FIG. 1 illustrates a method which serves as a starting point: Over the timed changeover, frames (F) are acquired with the camera device:

unbinned images 5 from a region with center point A (A is identical to the center point of the field of view of the camera device) with maximum resolution, half the width and height of the FoV binned images 6 at half resolution (horizontal and vertical) of the full field of view of the camera device.

FIG. 2 illustrates aspects of an exemplary embodiment of the solution, namely an adaptive ROI control unit.

The ego-vehicle (not shown) is currently driving through an urban area. In an urban area, it is important to provide and analyze regular up-to-date images of the entire capture region of the optronics system, since relevant objects, for example pedestrians, intersecting vehicles or overhead traffic lights or traffic signs, may also emerge in the peripheral regions of the field of view of the optronics system. As soon as relevant objects are detected, a maximum-resolution image of a subregion of the capture region of the optronics system may be captured, in accordance with the current situation, so that the object is recognized quickly and reliably.

If no relevant object is currently detected, a subregion such as that defined in FIG. 1 by reference sign 5 could be captured, by which more distant objects may be detected (earlier), since the subregion is captured with maximum resolution by the optronics system. For as long as no relevant object is detected, the high-resolution central subregion 5 could for example be captured as every fourth image of the sequence of images. Alternatively, periodically alternatingly binned and unbinned images could be generated or captured.

In the situation depicted in FIG. 2, the ego-vehicle is located directly at an intersection, it being assumed, for the sake of simplicity, that the ego-vehicle is at a standstill.

A traffic light is located in the upper region of the field of view (i.e. of the capture region) of the camera device. In the right-hand region of the field of view, a second vehicle is located, which is joining the intersection from the right or will enter it in the future. Taking the approach explained with reference to FIG. 1, the image portion 3 shown with dotted lines (maximum resolution, comparable to an unbinned image 5 in FIG. 1) would be captured as an unbinned ROI. However, the full driving situation cannot be inferred from this region: the second vehicle is not included in this ROI 3 at all and only the bottommost edge of the traffic lights.

In contrast, with a situation-adapted ROI selection for example the second vehicle may be completely captured with the image portion 1 or at least in part with the image portion 2 or the traffic light may likewise be completely captured with the image portion 4.

Thus, image capture control could in this situation proceed such that a binned overview image of the full imager area is generated and analyzed as first image. In a second image, the subregion 4 is captured and analyzed unbinned, from which it may for example be inferred whether the traffic light is currently green.

In a third image, a binned overview image is again generated, in order for example to be able to detect whether the second vehicle (on the right in the image) has moved or whether a new road user has emerged on the left. If movement of an object is detected in the third image (for example by comparison with the first image), a prediction of object movement may be made for capture of the fourth image, in order to adapt the subregion to be captured in such a way that the object is fully captured in the fourth image (and with maximum resolution).

In the fourth image, the subregion 1 is captured unbinned, for example in order to confirm that the second vehicle is stationary to the right, i.e. has not moved, and if the ego-vehicle moves in a straight line there is no risk of collision with the second vehicle.

In only four images, the overall situation (or driving situation), insofar as is apparent through the capture region of the optronics system, may be completely captured and understood through the corresponding analysis of the individual binned and/or unbinned images. In this driving situation, the ego-vehicle may commence or continue its journey without risk.

The invention claimed is:

1. A camera device for capturing a surrounding region of a vehicle, the camera device comprising:
an optronics system and an image capture control unit, which are configured to acquire a sequence of images of the surrounding region,
wherein:
the optronics system comprises a wide-angle optical system and a high-resolution image acquisition sensor, and
the optronics system and the image capture control unit are configured:
to produce, respectively for each individual image of the sequence of images, either a reduced-resolution image as a binned image, which has a reduced resolution that is reduced by pixel binning, of an entire capture region of the optronics system, or a high-resolution image as an unbinned image with a maximum resolution of a subregion of the capture region of the optronics system, depending on a current traffic and/or surrounding situation, wherein an image height and an image width of the subregion in the high-resolution image are set depending on the current traffic and/or surrounding situation, and wherein a size of the subregion is set such that a pixel count of the high-resolution image of the subregion is no greater than a pixel count of the reduced-resolution image of the entire capture region of the optronics system; and to control the image height and/or the image width of the subregion in a current image of the sequence of images in response to a recognized content that is recognized in at least one previous image of the sequence of images.

2. The camera device according to claim 1, wherein the optronics system and the image capture control unit are configured to acquire the sequence of images so that a center point of each said subregion is identical to a center point of the entire capture region of the optronics system.

3. The camera device according to claim 1, wherein the optronics system and the image capture control unit are configured to shift a vertical position of the subregion as a function of the current traffic and/or surrounding situation.

4. The camera device according to claim 3, wherein the optronics system and the image capture control unit are configured to shift a horizontal position of the subregion as a function of the current traffic and/or surrounding situation.

5. The camera device according to claim 1, wherein the optronics system and the image capture control unit are configured to acquire the sequence of images so that the pixel count of the high-resolution image of the subregion amounts to 2.5 megapixels at most.

6. The camera device according to claim 1, wherein the optronics system and the image capture control unit are configured to acquire the sequence of images so that the pixel count of the high-resolution image of the subregion is constant during acquisition of the sequence of images of the surrounding region.

7. The camera device according to claim 1, wherein a prediction of the recognized content for the current image is taken into account for controlling the image height and/or the image width of the subregion.

8. The camera device according to claim 1, wherein the optronics system and the image capture control unit are configured to acquire the sequence of images so that the sequence of images includes, periodically alternatingly, the reduced-resolution image of the entire capture region and the high-resolution image of the subregion.

9. A method of capturing a surrounding region of a vehicle by an optronics system, wherein the optronics system comprises a wide-angle optical system and a high-resolution image acquisition sensor, and the method comprises acquiring a sequence of images of the surrounding region, which includes: of e ego-vehicle, producing, respectively for each individual image of the sequence of images, either a reduced-resolution image as a binned image, which has a reduced resolution that is reduced by pixel binning, of an entire capture region of the optronics system, or a high-resolution image as an unbinned image with a maximum resolution of a subregion of the capture region of the optronics system, depending on a current traffic and/or surrounding situation, a setting an image height and an image width of the subregion respectively in each said high-resolution image depending on the current traffic and/or surrounding situation, setting a size of the subregion such that a pixel count of the high-resolution image of the subregion is no greater than a pixel count of the reduced-resolution image of the entire capture region of the optronics system, and controlling the image height and/or the image width of the subregion in a current image of the sequence of images in response to a recognized content that is recognized in at least one previous image of the sequence of images.

10. The camera device according to claim 1, wherein the optronics system and the image capture control unit are configured to shift a horizontal position of the subregion as a function of the current traffic and/or surrounding situation.

* * * * *

UNITED STATES PATENT AND TRADEMARK OFFICE
CERTIFICATE OF CORRECTION

PATENT NO. : 10,798,319 B2
APPLICATION NO. : 16/461172
DATED : October 6, 2020
INVENTOR(S) : Karsten Breuer et al.

Page 1 of 1

It is certified that error appears in the above-identified patent and that said Letters Patent is hereby corrected as shown below:

In the Claims

Column 12,
(Claim 9) Line 9, after "includes:", delete "of e ego-vehicle,";
(Claim 9) Line 20, before "setting", delete "a".

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*